United States Patent
Nomura et al.

(10) Patent No.: US 6,851,865 B2
(45) Date of Patent: Feb. 8, 2005

(54) BEARING DEVICE FOR AXLE

(75) Inventors: Keisuke Nomura, Osaka (JP); Masahiro Inoue, Osaka (JP)

(73) Assignee: Koyo Seiko Co., Ltd., Osaka (JP)

(*) Notice: Subject to any disclaimer, the term of this patent is extended or adjusted under 35 U.S.C. 154(b) by 49 days.

(21) Appl. No.: 10/240,408

(22) PCT Filed: Aug. 10, 2001

(86) PCT No.: PCT/JP01/06949
§ 371 (c)(1),
(2), (4) Date: Oct. 1, 2002

(87) PCT Pub. No.: WO02/14087
PCT Pub. Date: Feb. 21, 2002

(65) Prior Publication Data
US 2003/0048966 A1 Mar. 13, 2003

(30) Foreign Application Priority Data
Aug. 11, 2000 (JP) ......................................... 2000-243527

(51) Int. Cl.$^7$ .............................................. F16G 35/00
(52) U.S. Cl. ....................................... 384/544; 384/542
(58) Field of Search ................................ 384/544, 542, 384/538, 589; 301/105.1; 464/178

(56) References Cited

U.S. PATENT DOCUMENTS

| | | | |
|---|---|---|---|
| 4,371,214 A | 2/1983 | Strader | ........................ 301/126 |
| 6,485,188 B1 * | 11/2002 | Dougherty | ................... 384/589 |
| 6,550,975 B2 * | 4/2003 | Inoue et al. | ................. 384/537 |

FOREIGN PATENT DOCUMENTS

| | | |
|---|---|---|
| JP | 61-50831 | 3/1986 |
| JP | 109203 | 7/1988 |
| JP | 109204 | 7/1988 |
| JP | 2000-185507 | 7/2000 |

* cited by examiner

Primary Examiner—Thomas R. Hannon
(74) Attorney, Agent, or Firm—Jordan and Hamburg LLP

(57) ABSTRACT

A bearing device for axle, comprising a hub wheel, a double row ball bearing, a constant velocity joint, and a tightening member, the constant velocity joint further comprising an outer ring having a cup-shaped cylindrical part for storing a tilted movement guiding element therein and, at the small diameter part thereof, a shaft part (outer ring shaft part) inserted into the hollow shaft part of the hub wheel and fixed to rotate in circumferential direction, wherein the tightening member is fixed to the vehicle outer side shaft end of the outer ring shaft part of the constant velocity joint, and a held part provided between an axial intermediate part of the hollow shaft part of the hub wheel and the vehicle outer side shaft end is sandwiched axially by the axial intermediate part of the outer ring shaft part of the constant velocity joint and the tightening member.

6 Claims, 10 Drawing Sheets

F I G. 2
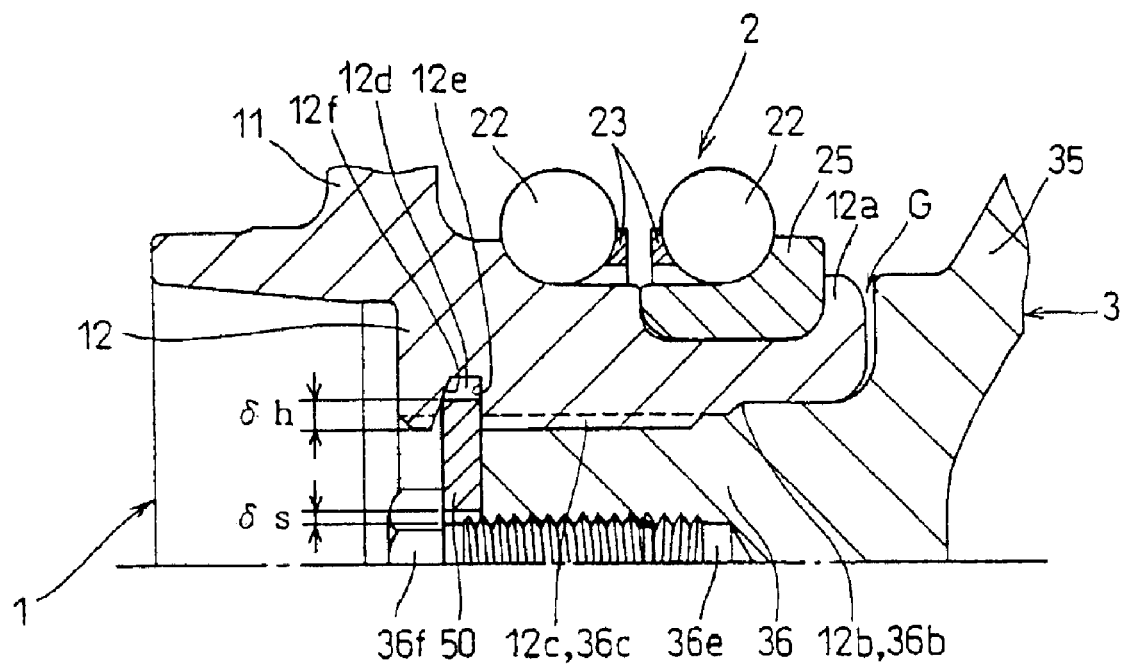

F I G. 12
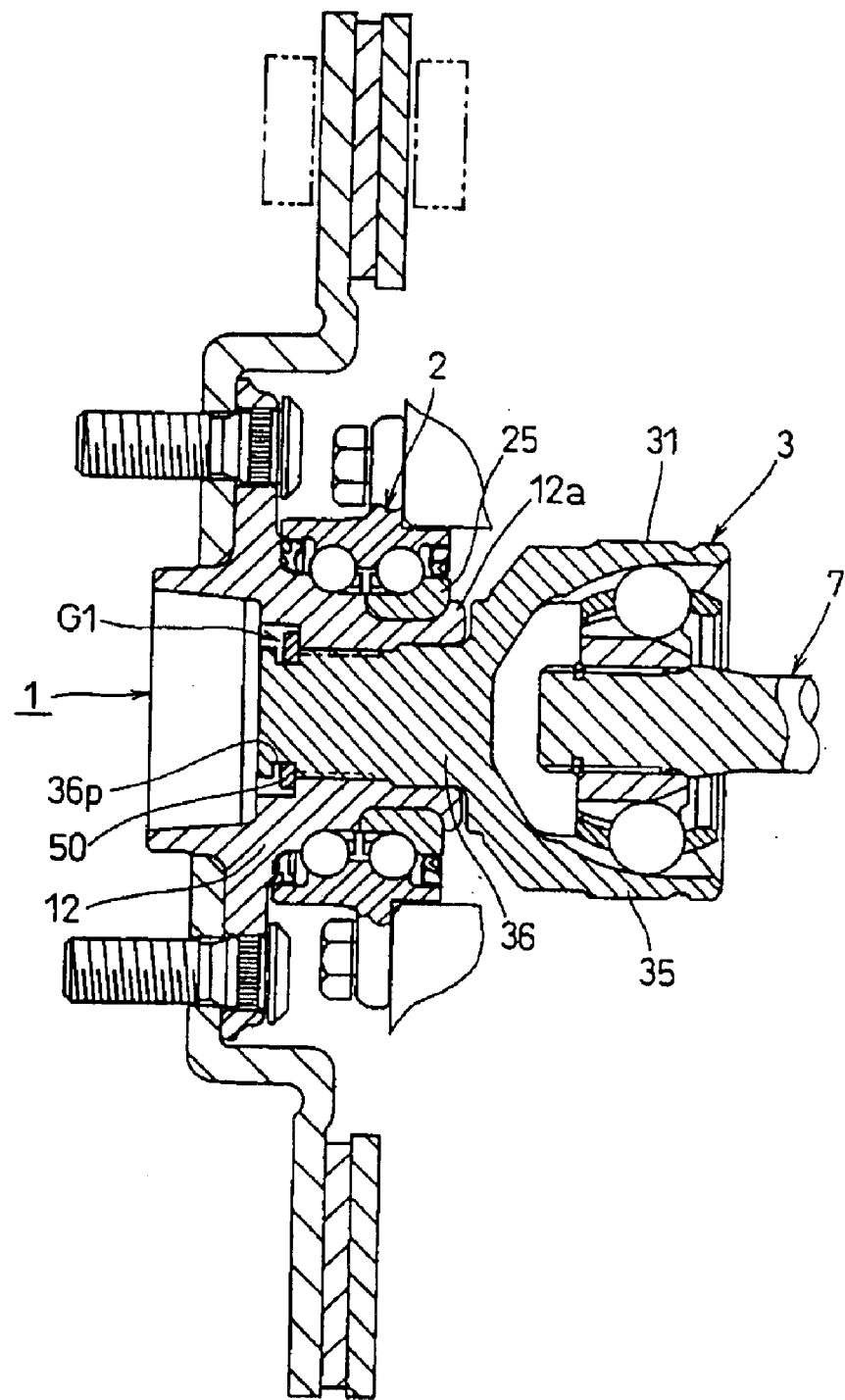
PRIOR ART

BEARING DEVICE FOR AXLE

TECHNICAL FIELD

The present invention relates to a bearing device for an axle wherein a disk rotor of a disk brake device and wheels can be mounted.

BACKGROUND TECHNIQUE

The inventor of the present invention proposes a bearing device for an axle shown in FIG. 12. In the bearing device for an axle shown in the figure, a hub wheel 1 is jointed with a shaft 7 by a constant velocity joint 3 in a state the hub wheel 1 can be tilted.

A shaft end in a vehicle inner side of a hollow shaft 12 of the hub wheel 1 is bent and deformed in a radially outward direction so as to constitute a caulked portion 12a, which is caulked on an outer end face of an inner ring 25 of a double row rolling bearing 2. The inner ring 25 is preloaded by the caulked portion 12a and also is fitted so as not to come off from the hub wheel 1.

An outer ring 31 of the constant velocity joint 3 comprises a cup-shaped cylindrical portion 35 to store tilt movement guiding elements therein, and a shaft portion 36 which is inserted into the hollow shaft 12 of the hub wheel 1 in a small diameter portion of the cup-shaped cylindrical portion 35 and fitted by a spline fitting so as not to be rotated in a circumferential direction.

The caulked portion 12a of the hollow shaft 12 and a vehicle outer side are fitted in a manner of being sandwiched from an axial direction by the cup-shaped cylindrical portion 35 of the constant velocity joint 3 and a snap ring 50 in a section C shape arranged in a peripheral groove 36p on the vehicle outer side of the shaft portion 36, thereby the outer ring 31 of the constant velocity joint 3 is combined with the hub wheel 1.

In such a combination manner, when the snap ring 50 is inserted into the peripheral groove 36p in a state of leaving a required gap G1 in the axial direction, the outer shaft 36 is inclined to rattle in the axial direction with respect to the hollow shaft 12, which is caused by the gap G1. Under the circumstances, the outer ring 31 of the constant velocity joint 3 cannot be stably located with respect to the caulked portion 12a of the hollow shaft 12

As an idea for stabilization of the location of the constant velocity joint 3, it is suggested that the snap ring 50 is inserted into the peripheral groove 36p in a manner that the gap G1 is not generated so as to prevent the rattle.

However, such a manner of insertion makes it uneasy to insert the snap ring 50 and also to combine the outer ring 31 of the constant velocity joint 3 with the hub wheel 1.

Continuously, if the snap ring 50 is inserted with an excessive strength, a compression load affects on the hollow shaft 12 in the axial direction, thereby the caulked portion 12a of the hub wheel 1 is compressed and deformed, and then an excessive load is imparted to the double row rolling bearing 2. By this action, the double row rolling bearing 2 is excessively pressurized, and a rolling feature of the double row rolling bearing 2 is reduced. In response to that, the outer ring 31 of the constant velocity joint 3 has to be combined with the hub wheel 1 under required conditions, which is a hassle.

Therefore, a main object of the present invention is to provide a bearing device for an axle which is capable of maintaining an appropriate level of preload with respect to a double row rolling bearing, and stably locating an outer ring of a constant velocity joint with respect to a caulked portion of a shaft end in a vehicle inner side of a hollow shaft of a hub wheel, while easily combining the outer ring of the constant velocity joint with the hollow shaft.

DISCLOSURE OF THE INVENTION

A bearing device for an axle according to the present invention comprises a hub wheel having a hollow shaft, wherein a wheel can be mounted, a rolling bearing which is fitted outwardly to the hollow shaft of the hub wheel, a constant velocity joint tiltably combining the hub wheel with respect to a driving shaft and a fastening member of fastening the constant velocity joint to the hub wheel.

A shaft end in a vehicle inner side of the hollow shaft of the hub wheel is caulked to an outer end face of an inner ring in a vehicle inner side of the rolling bearing. The constant velocity joint is equipped with an outer ring having; a cylindrical portion wherein tilt movement guiding elements with respect to the driving shaft is accommodated, and a shaft portion (an outer ring shaft portion) which is formed integral with the cylindrical portion and inserted into the hollow shaft of the hub wheel so as to not to be rotated in a circumferential direction.

The fastening member is fitted to a vehicle outer side of the outer ring shaft portion of the constant velocity joint. A held portion provided between an axial intermediate position in the hollow shaft portion of the hub wheel and the vehicle outer side is sandwiched from an axial direction by the axial intermediate position in the outer ring shaft portion of the constant velocity joint and the fastening member. In this manner, the outer ring of the constant velocity joint is located and coupled in the axial direction with respect to the hollow shaft portion of the hub wheel.

According to the present invention, the held portion provided between the axial intermediate position and the vehicle outer side in the hollow shaft portion of the hub wheel is sandwiched from the axial direction by the axial intermediate position in the outer ring shaft portion of the constant velocity joint and the fastening member. Therefore, a preload with respect to a double row rolling bearing can be maintained at an appropriate level with only an adjustment of a fastening position with respect to the outer ring shaft portion of the constant velocity joint by the fastening member, and also the outer ring of the constant velocity joint is stably located with respect to a caulked portion of the shaft end in the vehicle inner side of the hollow shaft of the hub wheel. Subsequently, the outer ring of the constant velocity joint can be easily combined with the hub wheel.

Preferably in the present invention, as to the hollow shaft portion of the hub wheel, in the axial intermediate position in an inner periphery thereof, the vehicle inner side constitutes a large diameter and has a first step obtained by the vehicle outer side constituting a small diameter. As to the outer ring shaft portion of the constant velocity joint, in the axial intermediate position in an outer periphery thereof, the vehicle inner side constitutes a large diameter, and has a second step obtained by the vehicle outer side constituting a small diameter. The first step and the vehicle outer side in the hollow shaft of the hub wheel form the held portion, which is sandwiched from the axial direction by the second step in the outer ring shaft portion of the constant velocity joint and the fastening member.

In this case, the sandwiching state is stabilized by the first and second steps. Therefore, the outer ring of the constant velocity joint can be more easily combined with the hub wheel maintaining an appropriate level of preload with respect to a double row rolling bearing with only an adjustment of a fastening position by the fastening member with respect to the outer ring shaft portion of the constant velocity joint, and also stably locating the outer ring of the constant velocity joint with respect to a caulked portion of the shaft end in the vehicle inner side of the hollow shaft of the hub wheel.

Preferably in the present invention, the hollow shaft portion of the hub wheel has a radially inward annular member in the inner periphery of the vehicle outer side thereof, and the held portion is formed by the axial intermediate position in the hollow shaft portion of the hub wheel and the annular member. The held portion is in a state of being sandwiched from the axial direction by the axial intermediate position in the outer ring shaft portion of the constant velocity joint and the fastening member, whereby the outer ring of the constant velocity joint is combined with the hub wheel in a state of being positioned in the axial direction. In the embodiment, the annular member is described as a snap ring, that is a separate structure from the hollow shaft portion of the hub wheel, however, can be a structure integrated with the hollow shaft portion.

Preferably in the present invention, a peripheral groove is arranged in the vehicle outer side of the hollow shaft portion of the hub wheel, and the annular member comprises a snap ring which is latched together with the peripheral groove and extending in a radially inward direction. Also, the outer ring shaft portion of the constant velocity joint is fitted to the hollow shaft portion of the hub wheel so as not to be rotated. The snap ring is inserted into the peripheral groove in the hollow shaft portion in a state that a diameter thereof is elastically expanded and is also fixed to the shaft end portion in the vehicle outer side of the outer ring shaft portion in a state of being positioned in the axial direction, and the peripheral groove converts a diameter expanding elastic force into a force to draw the outer ring shaft portion to the vehicle outer side.

In this case, the snap ring is inserted into the peripheral groove in the hollow shaft portion in a state that a diameter thereof is elastically expanded, and the outer ring of the constant velocity joint is combined with the hollow shaft portion of the hub wheel in the axial direction without a rattle.

In this case, since the peripheral groove converts the diameter expanding elastic force into the force to draw the outer ring shaft portion to the vehicle outer side, there is no action of an axial compression load in the hollow shaft portion.

Preferably in the present invention, an inner wall of the peripheral groove in the vehicle outer side constitutes a slant face gradually inclining to the vehicle outer side toward a groove opening side from a groove bottom side. The conversion of the forces is executed by an abutment of an outer peripheral angle portion of the snap ring against the slant face.

In this case, the diameter expanding elastic force of the snap ring can be more effectively converted to the force to draw the outer ring shaft portion to the vehicle outer side, whereby the outer ring of the constant velocity joint can be combined with the hollow shaft portion of the hub wheel with an axial rattle further reduced.

Preferably in the present invention, the outer ring shaft portion is fitted into the hollow shaft portion by the spline fitting, wherein the snap ring corrugated in a circumferential direction is axially engaged with the peripheral groove of the hollow shaft portion in an elastically compressed state. Then the snap ring is fixed to the end portion in the vehicle outer side of the outer ring shaft portion in a state of being positioned in the axial direction, and thereby an elasticity restoring force of the snap ring acts in a manner of drawing the outer ring shaft portion to the vehicle outer side.

In this case, the elasticity restoring force can be more effectively converted into the force to draw the outer ring shaft portion to the vehicle outer side, whereby the outer ring of the constant velocity joint can be combined with the hollow shaft portion of the hub wheel with an axial rattle further reduced.

Preferably in the present invention, a bolt hole is arranged in an end face of the shaft end in the vehicle outer side of the outer ring shaft portion of the constant velocity joint, and the fastening member constitutes a bolt which is screwed into the bolt hole. The snap ring is fixed to the shaft end in the vehicle outer side of the outer ring shaft portion in a manner that an inner periphery side of the snap ring is sandwiched to be fixed between the end face of the shaft end in the vehicle outer side of the outer ring shaft portion and an end face of the bolt screwed into the bolt hole.

In this case, the snap ring can be stably located in the axial direction by fastening the bolt tighter.

Preferably in the present invention, a small diameter screw-threaded shaft portion is arranged on the end face of the shaft end in the vehicle outer side, and the fastening member constitutes a nut screwed into the small diameter screw-threaded shaft portion. The snap ring is fixed to the end portion in the vehicle outer side of the outer ring shaft portion in a manner that an inner periphery side of the snap ring is sandwiched to be fixed between the end face of the vehicle outer side of the outer ring shaft portion and an end face of the nut screwed into the bolt hole.

In this case, the snap ring can be stably located in the axial direction by fastening the nut tighter.

BRIEF DESCRIPTION OF THE DRAWINGS

FIG. 2 is an enlarged view of a main portion in FIG. 1.

FIG. 12 is a side view of a longitudinal section of a conventional bearing device for an axle

THE BEST MODE FOR CARRYING OUT THE INVENTION

Figure 1:
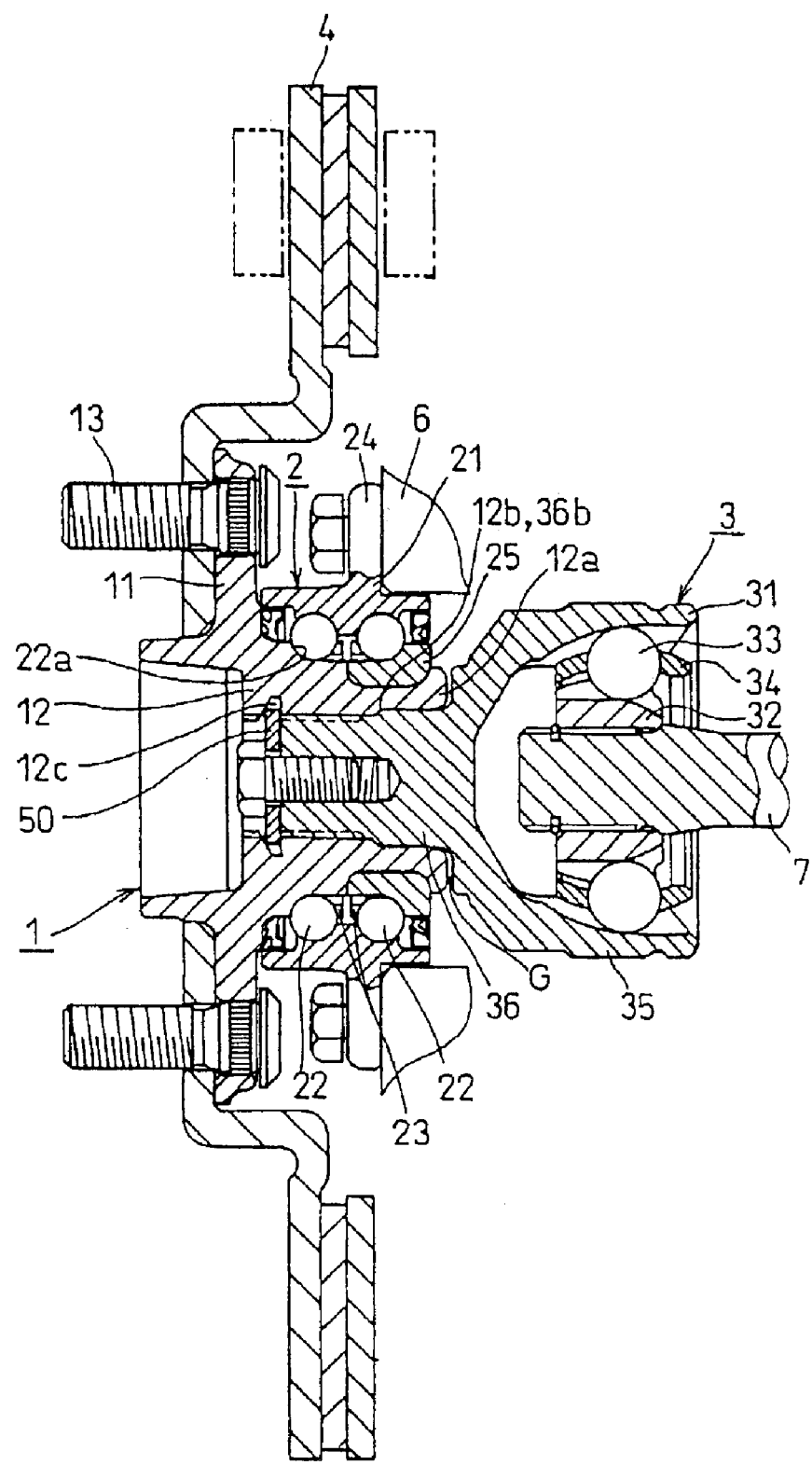
FIG. 1 is a side view of a longitudinal section of a bearing device for an axle according to the best mode for carrying out the present invention.
Figure 3:
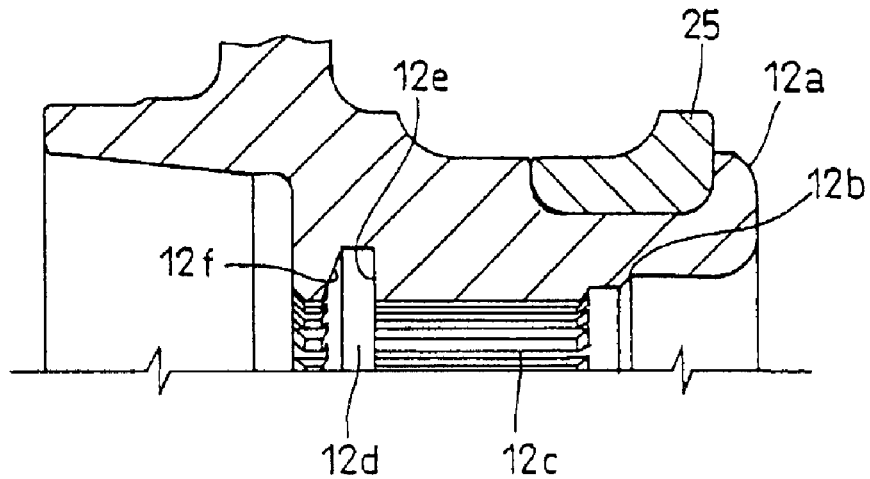
FIG. 3 is an enlarged view of a hub wheel in FIG. 1.
Figure 4:
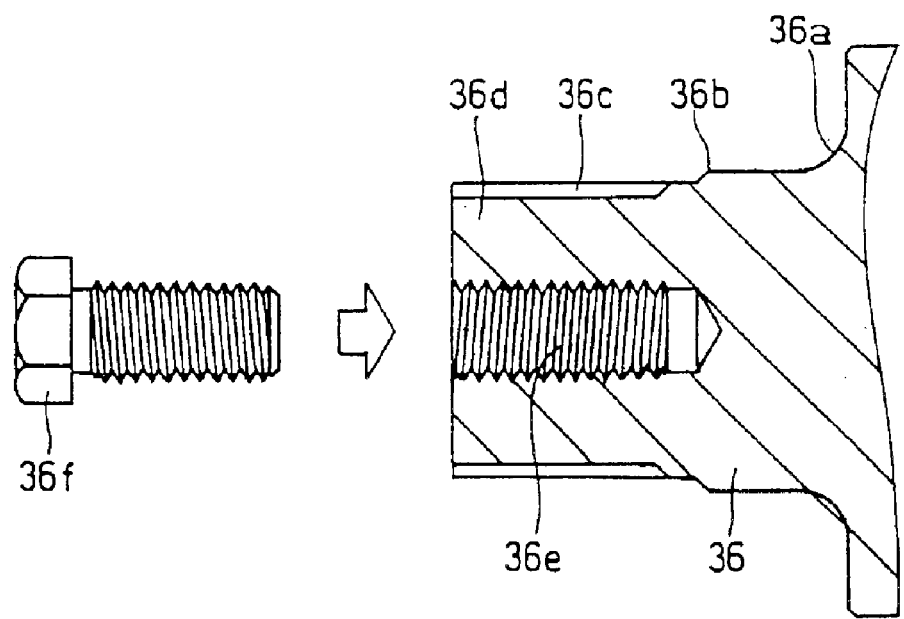
FIG. 4 is an enlarged view of an outer ring shaft portion of a constant velocity joint in FIG. 1.

Below is a description of the best mode for carrying out the present invention shown in the figures.

In reference to FIG. 1 through FIG. 6, a bearing device for an axle shown in these figures is a type of device used in a driving wheel side and comprises a hub wheel 1, a double row rolling bearing 2 and a constant velocity joint 3.

The hub wheel 1 has a radially outward flange 11 to which a wheel not shown in a figure is mounted and a hollow shaft 12 wherein the double row rolling bearing 2 is fixed to a bearing engaging region in an outer periphery thereof.

A raceway surface 22a for a group of balls 22 is formed closer to a vehicle outer side in an outer peripheral face of the hollow shaft 12 of the hub wheel 1. A shaft end in a vehicle inner side of the hollow shaft 12 of the hub wheel 1 is bent in a radially outward direction so as to constitute a caulked portion 12a, which is caulked to an outer end face of an inner ring 25 in the vehicle inner side of the double row rolling bearing 2.

The double row rolling bearing 2 comprises a single outer ring 21 having double row raceway grooves, a plurality of balls 22 as a rolling element arranged in double rows and two crown-shaped cages 23. Of originally required two inner rings, one utilizes the raceway surface 22a in the vehicle outer side of the hub wheel 1 as previously described and the configuration thereof is that only the inner ring 25 in the vehicle inner side is equipped.

Additionally, a radially outward flange 24 which is bolt-fixed to a vehicle body 6 and the like is formed on the outer ring 21.

A well-known, what is termed Zeppa type (bar field type) of constant velocity joint is designated for the constant velocity joint 3, which comprises an outer ring 31, an inner ring 32, a ball 33 and a cage 34 and the like. The outer ring 31 comprises a cup-shaped cylindrical portion 35 wherein the outer ring 31, the inner ring 32, the ball 33 and the cage 34 are accommodated, and a shaft portion (an outer ring shaft portion) 36 which is arranged integral with the cup-shaped cylindrical portion 35 in a small diameter side thereof. An end side of a shaft (a driving shaft) 7 is fitted into the inner ring 32 by a spline fitting and fixed by a locating snap ring (symbol omitted) so as not to come off. Another end side of the shaft 7 is attached to a vehicle deferential device via another constant velocity joint not shown in a figure.

The double row rolling bearing 2 is mounted in an outer peripheral face of the hub wheel 1 and the constant velocity joint 3 is mounted to the hub wheel 1 in proximity to the double row rolling bearing 2.

A bolt 13 to fix a disk rotor 4 of a disk brake device and a wheel (not shown in a figure) is penetrably inserted into a few positions in a circumference of the flange 11.

In such a bearing device for an axle, a rotational motive power of the shaft 7 is conveyed to the wheel which is mounted to the hub wheel 1 (not shown in a figure) via the constant velocity joint 3.

In the above-described bearing device for an axle, the caulked portion 12a which is formed by bending and deforming the shaft end in the vehicle outer side of the hollow shaft 12 in a radially outward direction and the cup-shaped cylindrical portion 35 in the outer ring 31 of the constant velocity joint 3 are in a state of no contact or a slight contact with each other.

In the embodiment of the present invention, a held portion provided between an axial intermediate position 12b of an inner periphery of the hollow shaft 12 of the hub wheel 1 and the vehicle outer side is sandwiched from an axial direction by an axial intermediate position 36b and the vehicle outer side in the outer periphery of the outer ring shaft portion 36 of the constant velocity joint 3, whereby the outer ring of the constant velocity joint 3 is joined with the hub wheel 1 in a state of being positioned in the axial direction.

As to the inner periphery of the hollow shaft 12 of the hub wheel 1, a range between the caulked portion 12a that is the shaft end in the vehicle inner side and the axial intermediate portion 12b constitutes a large diameter, and a range between the axial intermediate position 12b and the shaft end in the vehicle outer side constitutes a small diameter. The inner periphery has a first step obtained by the diameters, and a female spline 12c is provided on the small diameter thereof.

As to the outer periphery of the shaft portion 36 of the outer ring 31 of the constant velocity joint 3, a range between the shaft end 36a in the vehicle inner side and the axial intermediate portion 36b constitutes a large diameter, and a range between the axial intermediate position 36b and the vehicle outer. side constitutes a small diameter. The outer periphery has a second step obtained by the diameters, and a male spline 36c is provided on the small diameter thereof.

A peripheral groove 12d to latch together with a snap ring 50 is provided on the vehicle outer side of the hollow shaft 12. The peripheral groove 12d has opposing inner walls 12e and 12f in the vehicle inner and outer sides in the axial direction. The inner wall 12f in the vehicle outer side constitutes a slant face structure gradually inclining to the vehicle outer side toward a groove opening side from a groove bottom side.

A bolt hole 36e toward the vehicle inner side is provided in the end face center of a shaft end 36d in the vehicle outer side in the outer ring shaft portion 36 of the constant velocity joint 3. A bolt 36f as a fastening member is screwed into the bolt hole 36e.

Figure 5A:
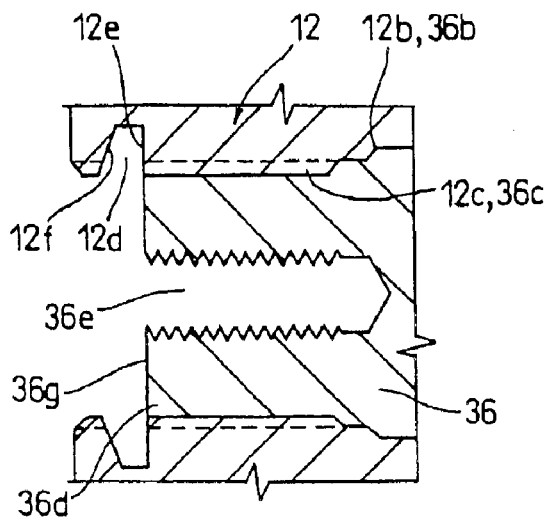
FIG. 5A is a sectional view of respective main portions provided for explanation of a first combining step of an outer ring shaft portion of a constant velocity joint with a hollow shaft portion of a hub wheel.
Figure 5B:
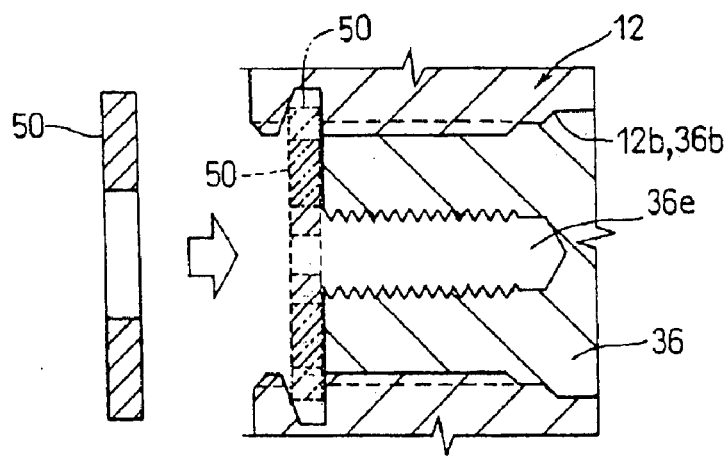
FIG. 5B is a sectional view of respective main portions provided for explanation of a second combining step of an outer ring shaft portion of a constant velocity joint with a hollow shaft portion of a hub wheel.
Figure 5C:
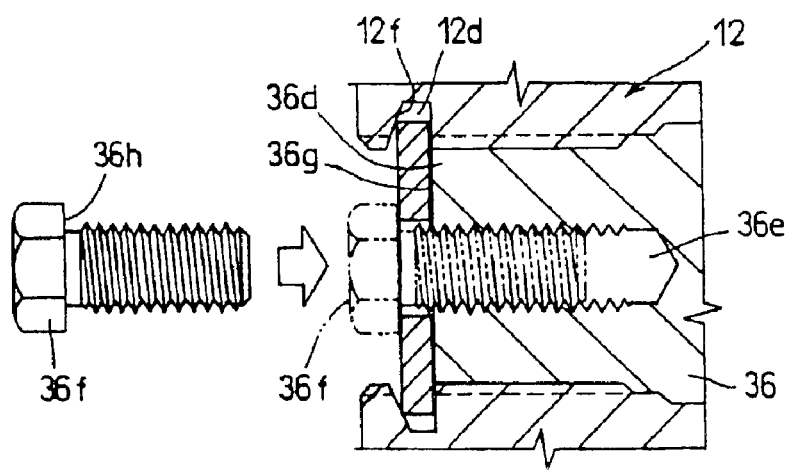
FIG. 5C a sectional view of respective main portions provided for explanation of a third combining step of an outer ring shaft portion of a constant velocity joint with a hollow shaft portion of a hub wheel.

In reference to FIG. 5A through C, a case of linking the outer ring 31 of the constant velocity joint 3 with the hollow shaft 12 of the hub wheel 1 is described.

As shown in FIG. 5A, an end face 36g of the shaft end 36d in the vehicle outer side of the outer ring shaft portion 36 of the constant velocity joint 3 is in a state of a substantial concordance in a radial direction with an inner wall 12e in the vehicle inner side of the peripheral groove 12d in the hollow shaft portion 12 of the hub wheel 1, and the outer ring shaft portion 36 thereof is inserted into the hollow shaft portion 12.

As shown in FIG. 5B, the snap ring 50 is an annular member latching together with the peripheral groove 12d and extending in a radially inward direction and is compressed with a diameter thereof reduced from a length of the radial direction shown in a solid line in a free state to a length of the radial direction shown in a dashed line. Then, compression state of the snap ring 50 is released toward inside the peripheral groove 12d of the hollow shaft portion 12.

Subsequently, an outer diameter side of the snap ring 50 is extended in the radial direction by a diameter expanding elastic force thereof, and inserted into the peripheral groove 12d as shown in a phantom line.

Consequently, as in FIG. 5C, the bolt 36f shown in a solid line is screwed into the bolt hole 36e of the outer ring shaft portion 36 via the snap ring 50 as illustrated in a phantom line, and an inner peripheral side of the snap ring 50 is sandwiched between an end face 36h inside a head portion of the bolt 36f and an end face 36g of the shaft end 36d in the vehicle outer side of the outer ring shaft portion 36.

Figure 6:
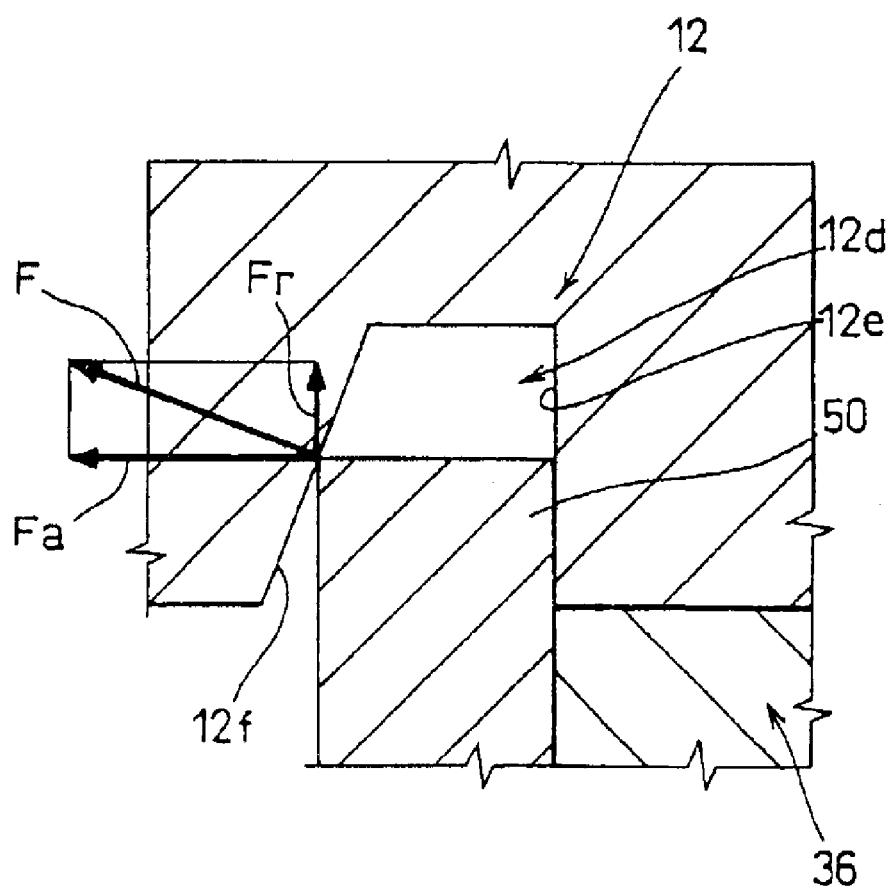
FIG. 6 a sectional view of a main portion provided for explanation of a conversion of a diameter expanding elastic force of a snap ring in an inner wall of a peripheral groove provided in a hollow shaft portion.

A description is given below of an action of the snap ring 50 which is sandwiched in this manner in reference to FIG. 6.

The snap ring 50 presses the inner wall 12f in the vehicle outer side of the peripheral groove 12d, which is subject to a diameter expanding elastic force F of the snap ring 50 from an outer peripheral angle portion thereof.

The diameter expanding elastic force F is converted into a force to draw the outer ring shaft portion 36 to the vehicle outer side by an abutment of the peripheral groove against the inner wall in the vehicle outer side. More specifically, the diameter expanding elastic force F is divided into an axial load Fa and an axial load Fb.

The hollow shaft portion 12 intends to be displaced to the vehicle outer side by the axial load Fa. In this case, the hollow shaft portion 12 is fixed to a vehicle body 6, therefore the outer ring portion 36 side is drawn to the hollow shaft portion 12 by the axial load Fa.

By this action, the outer ring shaft portion 36 is combined with the hollow shaft portion 12 so as to be positioned with no rattle in the axial direction.

In the described case, when the outer ring 31 of the constant velocity joint 3 is combined with the hub wheel 1, because the caulked portion 12a and the cup-shaped cylindrical portion 35 are in a state of no contact with each other, there is no excessive load imposed on the inner ring 25 of the double row rolling bearing 2 from the cup-shaped cylindrical portion 35. Therefore, a preload with respect to the inner ring 25 can be maintained at an appropriate level. As a result, a rolling feature of the double row rolling bearing 2 can be maintained so as to achieve a designed and desired life.

A large axial load in the vehicle inner side direction is occasionally imposed on the outer ring shaft portion 36. It is preferable to prevent the outer ring shaft portion 36 from coming off to the vehicle inner side direction by such an axial load. For the purpose, with respect to a gap δs between an inner diameter of the snap ring 50 and an outer diameter of the bolt 36f, a gap δh (>δs) between an outer diameter of the snap ring 50 and an inner diameter of the hollow shaft portion is set to a large value.

According to the embodiment of the present invention as above, the outer ring shaft portion 36 is combined with the hollow shaft portion 12 with no rattle in the axial direction. Also, in this combination, the hollow shaft 12 is subject to no axial compression load, which could lead to a deformation of an inner ring raceway of the double row rolling bearing 2.

Anotger Mode for Carrying out the Invention

1) In case of the above embodiment, the inner wall 12f in the vehicle outer side of the peripheral groove 12d of the hollow shaft 12 of the hub wheel 1 is configured in a slant face, and the inner wall 12e in the vehicle inner side thereof is configured in a perpendicular face, while the snap ring 50 is of an usual form.

Figure 7:
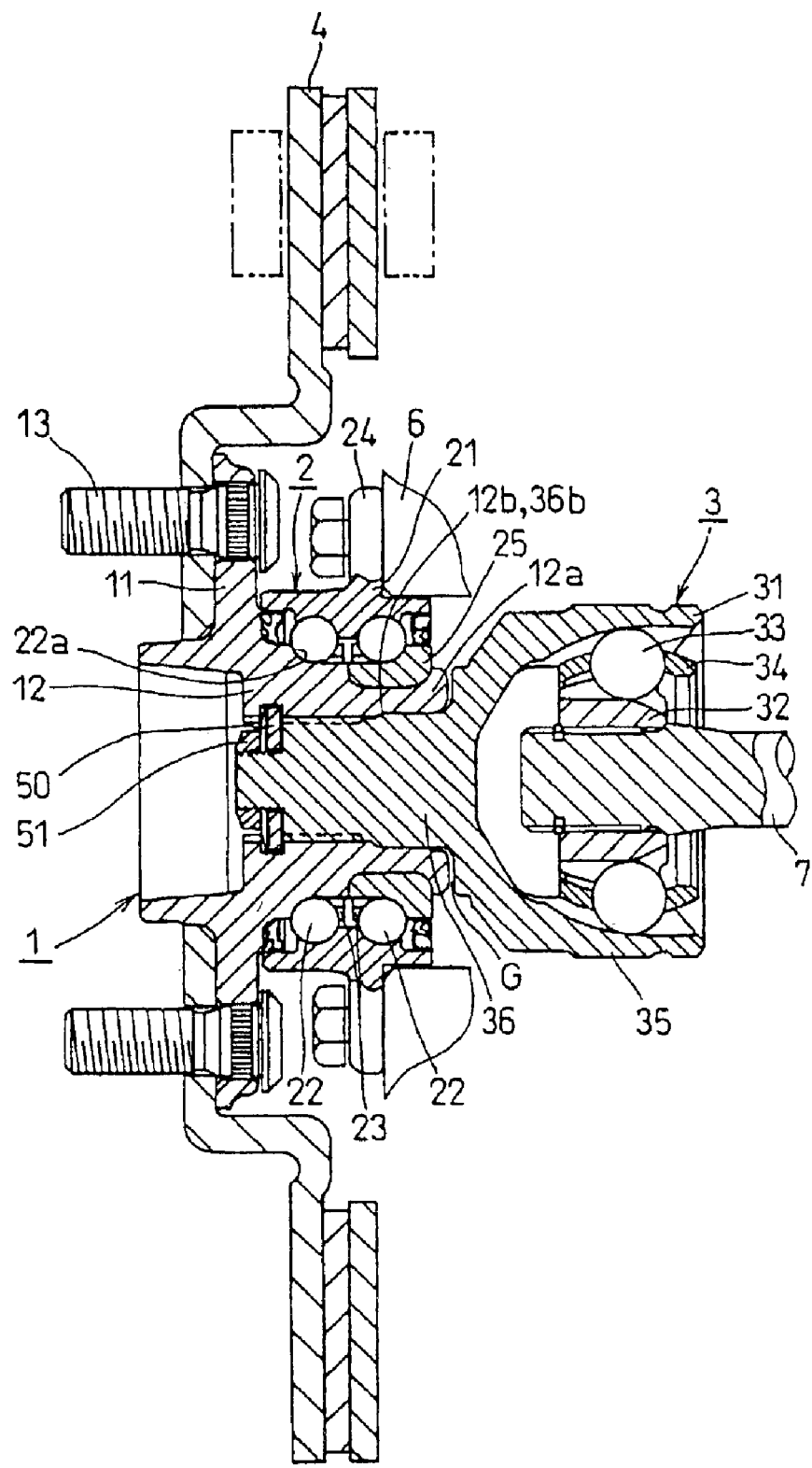
FIG. 7 is a side view of a longitudinal section of a bearing device for an axle according to another mode for carrying out the present invention.
Figure 8:
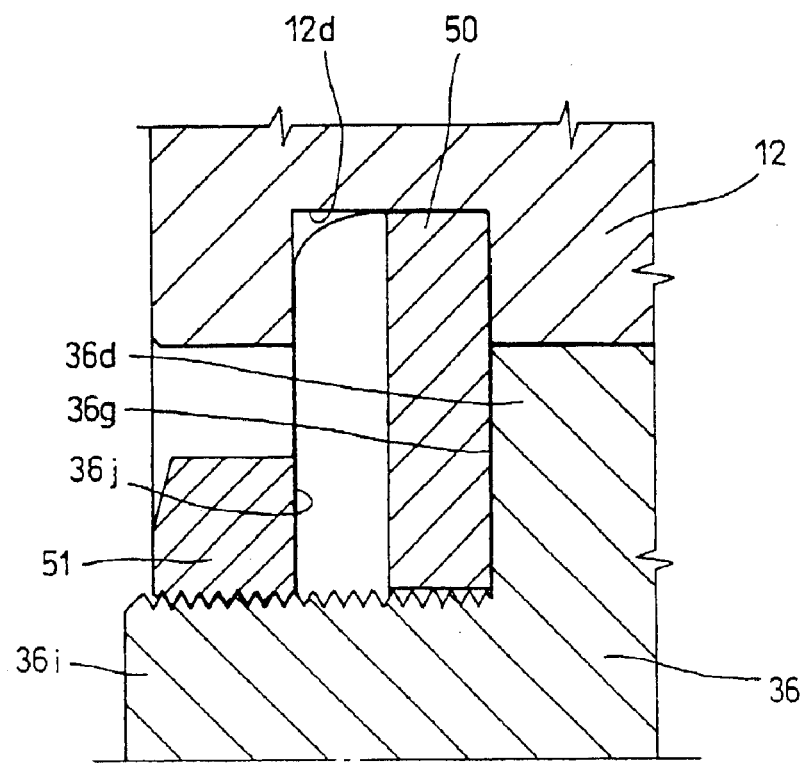
FIG. 8 is an enlarged view of a main portion in FIG. 7.
Figure 9:
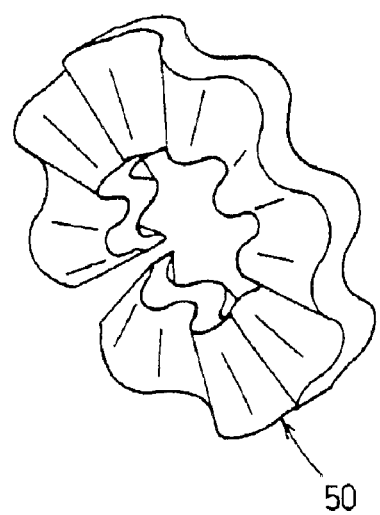
FIG. 9 is a perspective view of a snap ring in FIG. 7.

In contrast to this, as shown in FIG. 7 and FIG. 8, inner walls 12e and 12f may both constitute a perpendicular face and a snap ring 50 may be of a different form.

In other words, the snap ring 50 is circumferentially corrugated in configuration and has an axial width ta (>ta, in a limited case th is an axial groove width of a peripheral groove 12d). The snap ring 50 is inserted into the peripheral groove 12d in a state of being elastically compressed in an axial direction. Subsequent to that, an outer ring shaft portion 36 of a constant velocity 3 is drawn to a vehicle outer side by an action of an elasticity restoring force inside the peripheral groove 12d of the snap ring 50.

In this case, a small diameter screw-threaded shaft portion 36i is provided in the shaft end 36d in the vehicle outer side of the outer ring shaft portion 36, a nut 51 is screwed into the small diameter screw-threaded shaft portion 36i. Then, the snap ring 50 is sandwiched between an inner end face 36j of the nut 51 and an end face 36g of the shaft end 36d in the vehicle outer side of the outer ring shaft portion 36 in order for a stable location in the axial direction.

In case of the above embodiment, a fine gap G exists between a caulked portion 12a which is bent and deformed in a radially outward direction in the shaft end in the vehicle outer side of a hollow shaft portion 12 of a hub wheel 1 and a cup-shaped cylindrical portion 35 of the outer ring 31 of the constant velocity joint 3. There is a risk of an entry of muddy water into the fine gap, which may develop a corrosion therein caused by the muddy water remaining in a spline gap between an inner periphery of the hollow shaft portion 12 and an outer periphery of the outer ring shaft portion 36 of the constant velocity joint 3.

Figure 10:
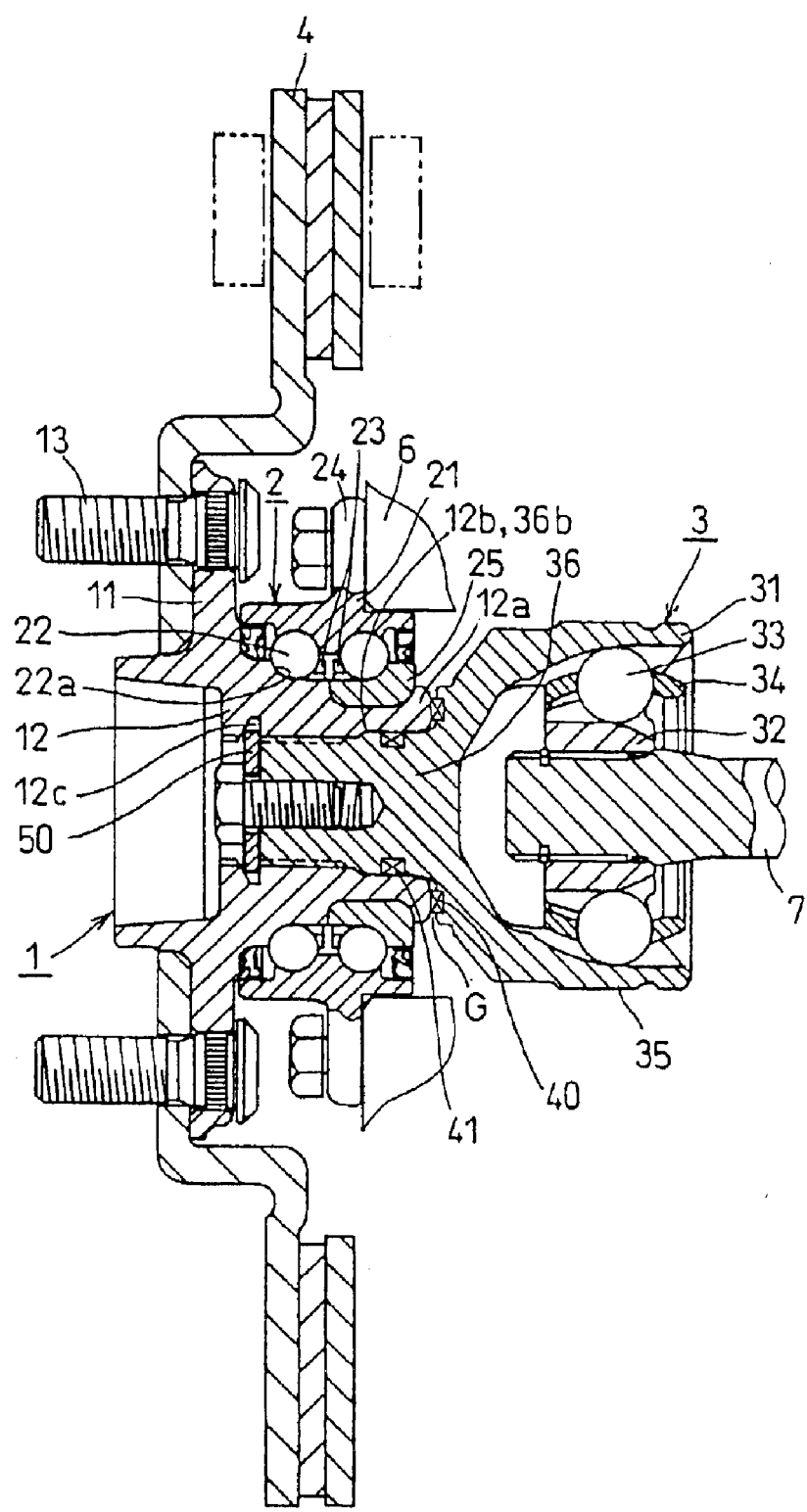
FIG. 10 is a side view of a longitudinal section of a bearing device for an axle according to still another mode for carrying out the present invention.
Figure 11A:
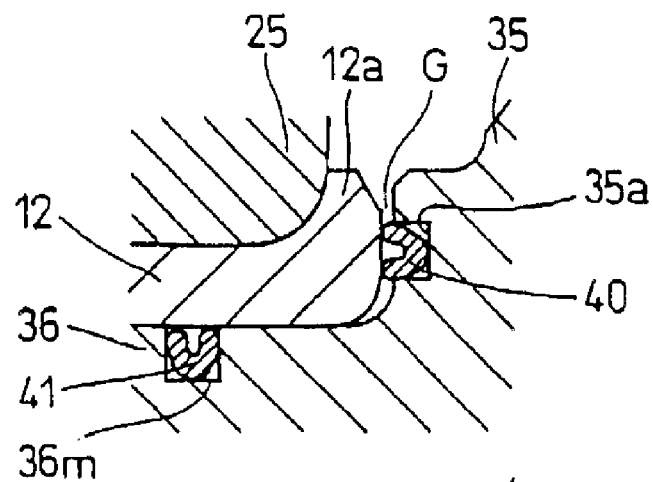
FIG. 11A is an enlarged perspective view of a main portion in FIG. 10 equipped with a seal.
Figure 11B:
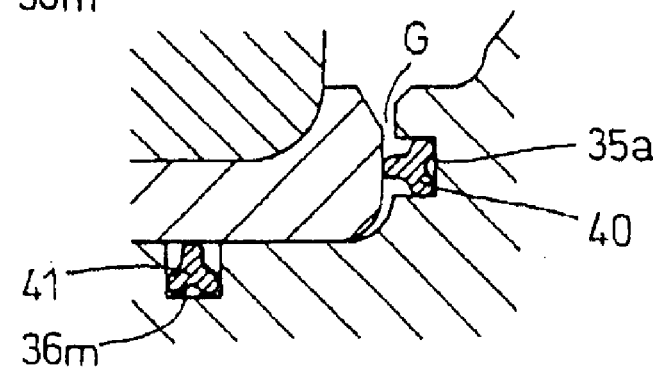
FIG. 11B is an enlarged perspective view of a main portion in FIG. 10 equipped with still another seal.
Figure 11C:
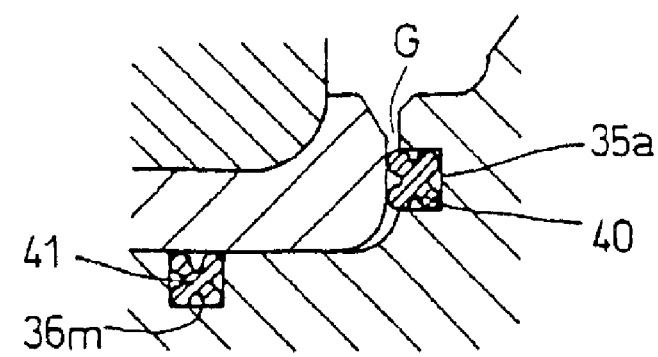
FIG. 11C is an enlarged perspective view of a main portion in FIG. 10 equipped with still another seal.
Figure 11D:
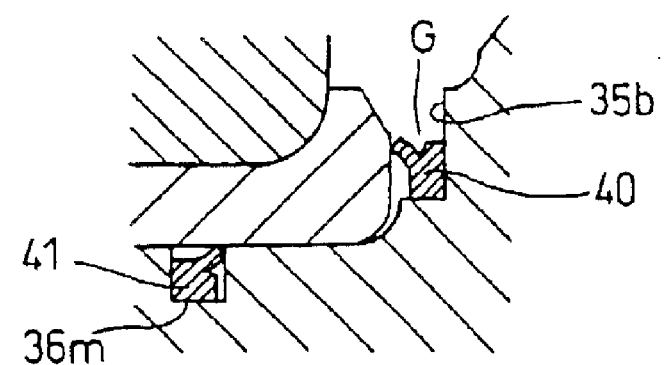
FIG. 11D is an enlarged perspective view of a main portion in FIG. 10 equipped with still another seal.

Preferably, in order to prevent the entry of muddy water, seals 40 and 41 shown in FIGS. 10 and 11 may be provided. FIG. 10 shows a side view of a longitudinal view of a bearing device for an axle, and FIG. 11 shows respective enlarged views of a main potion in FIG. 10 in order to illustrate a configuration example of the respective seals.

The seal 40 is made of an elastic body such as a rubber and the like and arranged between opposing faces in an axial direction of a caulked portion 12a and of a cup-shaped cylindrical portion 35. The seal 40 is inserted into an annular groove 35a as a concave portion shown in FIG. 11A-D or a cut out 35b as a concave portion shown in FIG. 11D so as to bung up the fine gap and prevent the entry of muddy water inside thereby.

The seal 41 is made of an elastic body such as a rubber and the like and arranged between opposing faces of an inner peripheral region of the hollow shaft 12 located closer to the vehicle inner side than splines 12f and 36f and of an outer peripheral region of the outer ring shaft portion 36 of the constant velocity joint 3. The seal 21 is inserted into an annular groove 36h as a concave portion shown in FIG. 11A-D so as to seal a space between the inner peripheral region of the hollow shaft portion 12 and the outer peripheral region of the outer ring shaft portion 36. This insertion prevents the entry of muddy water into the seal device 20 and the splines 12f and 36f and a subsequent corrosion therein.

The seals 40 and 41 are not both indispensable and either of them may be used.

The seals 40 and 41 may comprise a seal lip which is fixed to an annular cored bar having been inserted into the annular grooves 35a and 36h and thecut out 35b.

In the above embodiment, the caulked portion 12a of the hub wheel 1 and the cup-shaped cylindrical portion 35 axially opposing thereto are referred to as being in a non-contact state. The present invention is not limited to the reference. The outer ring 31 of the constant velocity joint 3 may be combined with the hub wheel 1 in a state the caulked portion 12a and the cup-shaped cylindrical portion 35 are in contact with each other.

In the above embodiment, as a radially inward annular member provided in the inner periphery in the vehicle outer side of the hollow shaft portion 12 of the hub wheel 1, the snap ring 50, as a separate body therefrom, was mentioned. However, the annular member may be integrally configured with the hollow shaft portion 12 as a part thereof.

Possibility of Industrial Application

The present invention can be applied to a bearing device for an axle wherein a disk rotor of a disk brake device and wheels can be mounted.

What is claimed is:

1. A bearing device for an axle, comprising:
   a hub wheel, having a hollow shaft portion;
   a rolling bearing, outwardly fitted to the hollow shaft portion of the hub wheel;
   a constant velocity joint, tiltably linking a driving shaft with the hub wheel and having an outer ring; and
   a fastening member, fastening the constant velocity joint to the hub wheel;
   wherein the outer ring of the constant velocity joint has a cylindrical portion accommodating tilt movement guiding elements with respect to the driving shaft and an outer ring shaft portion, formed integrally with the cylindrical portion and inserted into the hollow shaft portion of the hub wheel so as not to be rotated in a circumferential direction;
   the fastening member is mounted to a vehicle outer side of the outer ring shaft portion of the constant velocity joint;
   a held portion is provided in the hollow shaft portion of the hub wheel, between an axial intermediate position on said hollow shaft portion of the hub wheel and a vehicle outer side in the hollow shaft portion of the hub wheel;
   the held portion is sandwiched in an axial direction between an axial intermediate position in the outer ring shaft portion of the constant velocity joint and the fastening member, thereby the outer ring of the constant velocity joint is combined with the hub wheel in a state of being positioned in an axial direction;
   the hollow shaft portion of the hub wheel has a radially inward annular member in an inner periphery of the vehicle outer side thereof;
   the held portion is formed by the axial intermediate position in the hollow shaft portion of the hub wheel and the annular member, and the held portion is sandwiched from an axial direction by the axial intermediate position in the outer ring shaft portion of the constant velocity joint and the fastening member, thereby the outer ring of the constant velocity joint is combined with the hub wheel in a state of being positioned in anaxial direction,
   a peripheral groove is provided in the inner periphery in the vehicle outer side of the hollow shaft portion of the hub wheel, and the annular member comprises a snap ring latched together with the peripheral groove and extending in a radially inward direction;
   the outer ring shaft portion of the constant velocity joint is fitted to the hollow shaft portion of the hub wheel so as not to be rotated, and the snap ring is inserted into the peripheral groove of the hollow shaft portion in a state of a diameter thereof being elastically expanded and is also fixed to a shaft end in the vehicle outer side of the outer ring shaft portion in a state of being positioned in an axial direction;
   the peripheral groove converts a diameter expanding elastic first force of the snap ring into a second force to draw the outer ring shaft portion to a vehicle outer side.

2. The bearing device for an axle according to claim 1, wherein:
   the hollow shaft portion of the hub wheel has a first step by a vehicle inner side constituting a large diameter and by a vehicle outer side constituting a small diameter in an axial intermediate position in an inner periphery thereof;
   outer ring shaft portion of the constant velocity joint has a second step by an inner side constituting a large diameter and by a vehicle outer side constituting a small diameter in an axial intermediate position in an outer periphery thereof;
   the held portion is formed by the first step and the vehicle outer side in the hollow shaft portion of the hub wheel, and the held portion is sandwiched from an axial direction by the second step in the outer ring shaft portion of the constant velocity joint and the fastening member.

3. A bearing device for an axle according to claim 1, wherein an inner wall in a vehicle outer side in the peripheral groove constitutes a slant face gradually inclining to a vehicle outer side toward a groove opening side from a groove bottom side, and wherein the first force is converted into the second force by an abutment of an outer peripheral angle portion of the snap ring against the slant face.

4. A bearing device for an axle according to claim 1, wherein the outer ring shaft portion is fitted to the hollow shaft portion so as not to be rotated, and said snap ring is circumferentially corrugated and inserted into the peripheral groove of the hollow shaft portion in a state of being elastically compressed in an axial direction and is also fixed to an end portion in the vehicle outer side of the outer ring shaft portion in a state of being positioned in an axial direction;
   an elasticity restoring force of the snap ring acts in a manner of drawing the outer ring shaft portion to a vehicle outer side.

5. A bearing device for an axle according to claim 1, wherein:
   a bolt hole is provided in an end face of the shaft end in the vehicle outer side of the outer ring shaft portion of the constant velocity joint, and the fastening member constitutes a bolt screwed into the bolt hole;
   a manner wherein the snap ring is fixed to the shaft end in the vehicle outer side of the outer ring shaft portion coincides with a manner wherein an inner peripheral side of the snap ring is sandwiched and fixed between the end face of the shaft end in the vehicle outer side of the outer ring shaft portion and an end face of the bolt screwed into the bolt hole.

6. A bearing device for an axle according to claim 1, wherein:

a small diameter screw-threaded shaft portion is provided in the end face of the shaft end in the vehicle outer side of the outer ring shaft portion of the constant velocity joint, and the fastening member constitutes a nut screwed into the small diameter screw-threaded shaft portion;

a manner wherein the snap ring is fixed to the end portion in the vehicle outer side of the outer ring shaft portion coincides with a manner wherein the inner peripheral side of the snap ring is sandwiched and fixed between an end face of the shaft end in the vehicle outer side of the outer ring shaft portion and an end face of the nut screwed into the small diameter screw-threaded shaft portion.

* * * * *